United States Patent [19]

Rice et al.

[11] 4,353,436

[45] Oct. 12, 1982

[54] MANUAL WHEELCHAIR LIFT

[75] Inventors: Leonard L. Rice, Los Angeles; Marlin J. Freel, San Dimas; Gregory J. Paquin, Northridge; Howard E. Burkett, Culver City, all of Calif.

[73] Assignee: Ricon Corp., Sun Valley, Calif.

[21] Appl. No.: 140,928

[22] Filed: Apr. 16, 1980

[51] Int. Cl.³ ............................................. B60P 1/46
[52] U.S. Cl. ................................... 187/9 R; 414/540
[58] Field of Search .................. 187/9 R, 9 E, 98, 24, 187/25, 8.52; 414/540, 546, 921, 545; 280/289 WC; 14/71.3; 254/98

[56] References Cited

U.S. PATENT DOCUMENTS

| | | | |
|---|---|---|---|
| 687,537 | 11/1901 | Metzger | 187/98 |
| 2,802,549 | 8/1957 | Izquierdo et al. | 187/25 |
| 3,517,774 | 6/1970 | Meyer | 187/95 |
| 3,613,917 | 10/1971 | Fowler, Jr. | 414/540 |
| 3,651,965 | 3/1972 | Simonelli et al. | 414/540 |
| 3,870,126 | 3/1975 | Himes | 187/8.52 |
| 3,990,557 | 11/1976 | Carder | 187/8.52 |
| 4,026,387 | 5/1977 | Abreu | 187/9 R |
| 4,252,491 | 2/1981 | Hock | 414/921 |

Primary Examiner—Stanley H. Tollberg
Attorney, Agent, or Firm—Nilsson, Robbins, Dalgarn, Berliner, Carson & Wurst

[57] ABSTRACT

A vehicle mounted lift device for moving a wheelchair and its occupant to and from the bed of the vehicle includes a mounting apparatus fixed to the bed of the vehicle and a support assembly movably mounted to the mounting apparatus for being pivotally or translationally movable between a storage position and an outwardly extending operating position. The support assembly has a vertically stationary assembly which includes a pair of support posts, a lead screw mounted to each support post, a motive device for rotating the lead screws and a synchronizing apparatus interconnected so that the lead screws rotate at the same rate. The vertically stationary assembly also includes a safety flap apparatus to prevent inadvertent movement of the wheelchair from the vehicle through the access opening. The support assembly also has a vertically movable assembly which includes a coupling post interconnected to each lead screw and a foldable platform assembly pivotally connected between the coupling posts. As the lead screws are rotated the vertically movable assembly is raised or lowered. Switches prevent operation of the motive device when the support assembly is not in the operating position and when the vertically movable assembly is fully raised or fully lowered.

21 Claims, 15 Drawing Figures

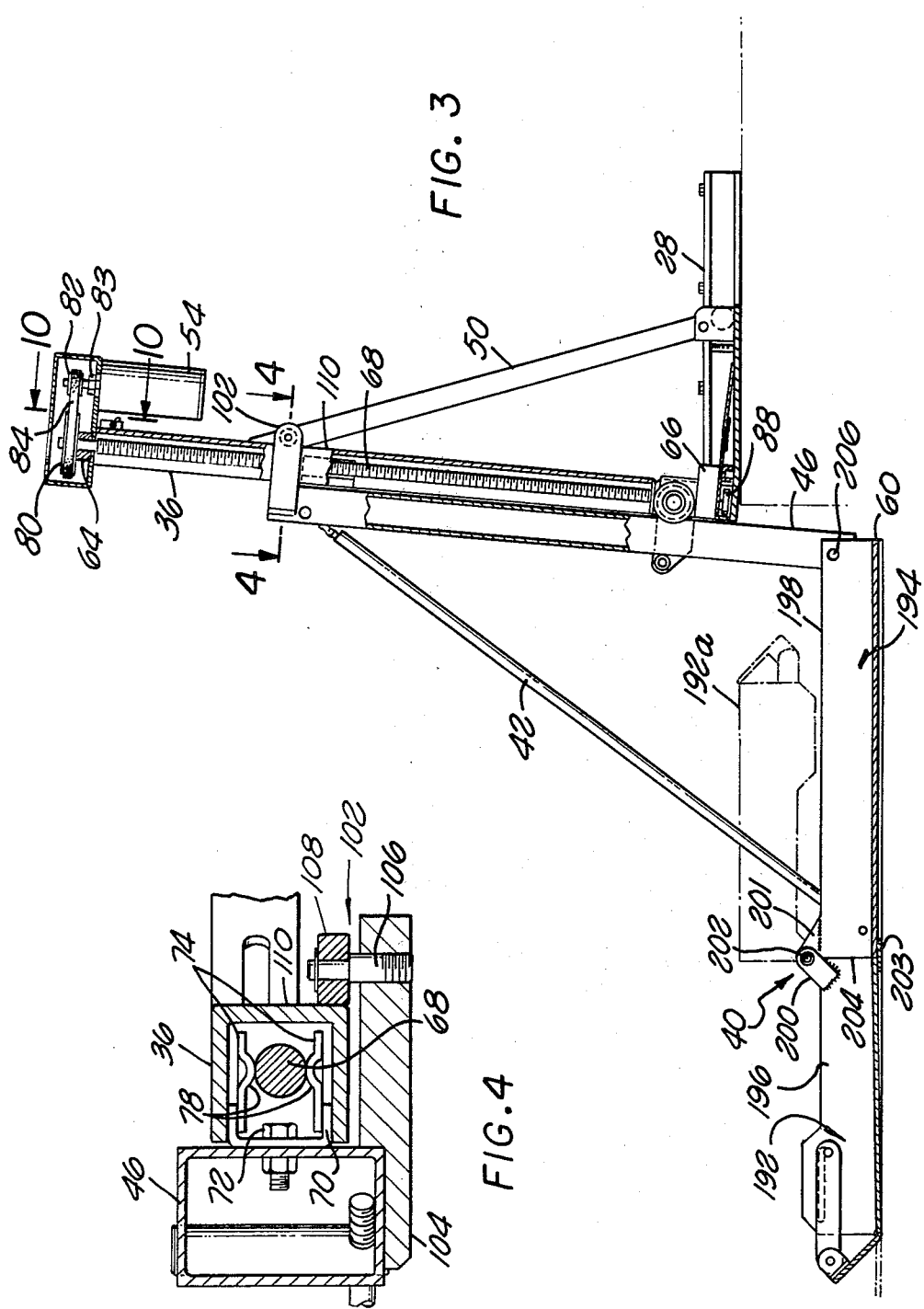

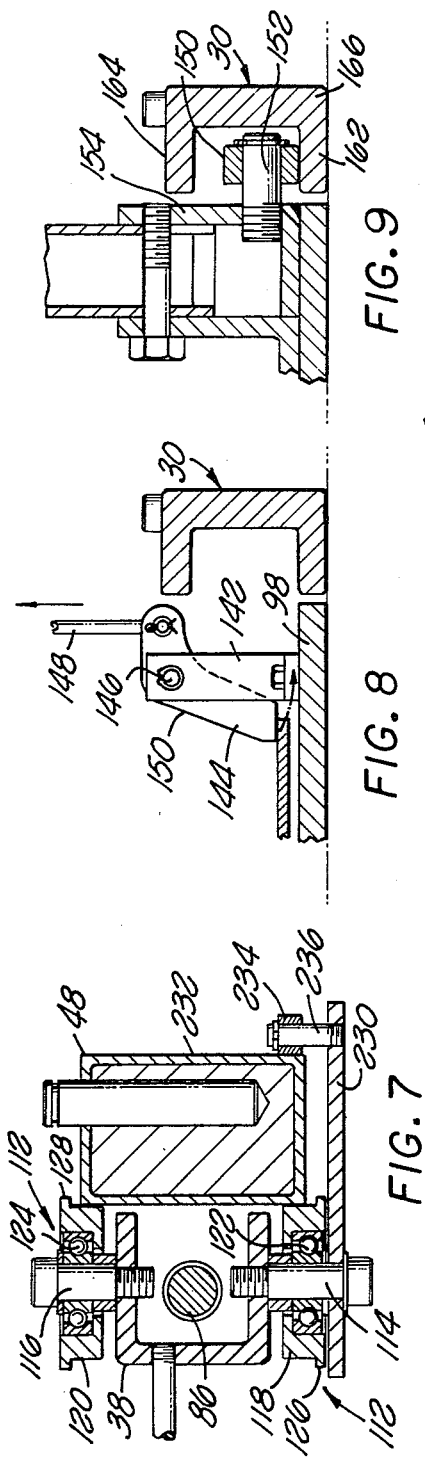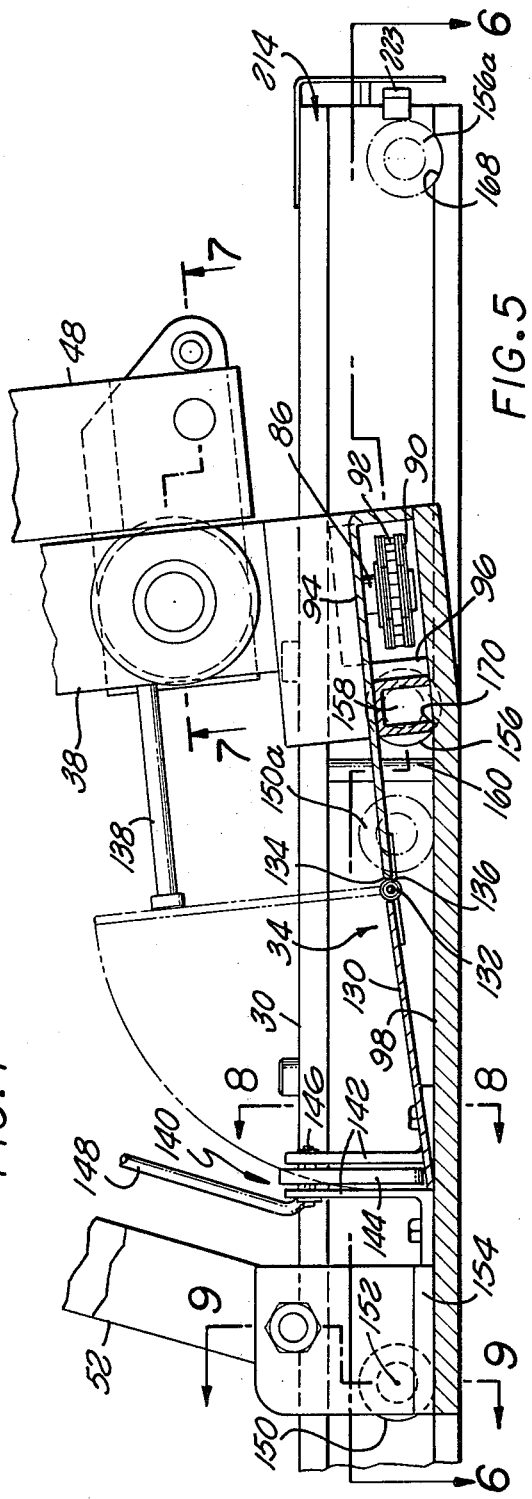

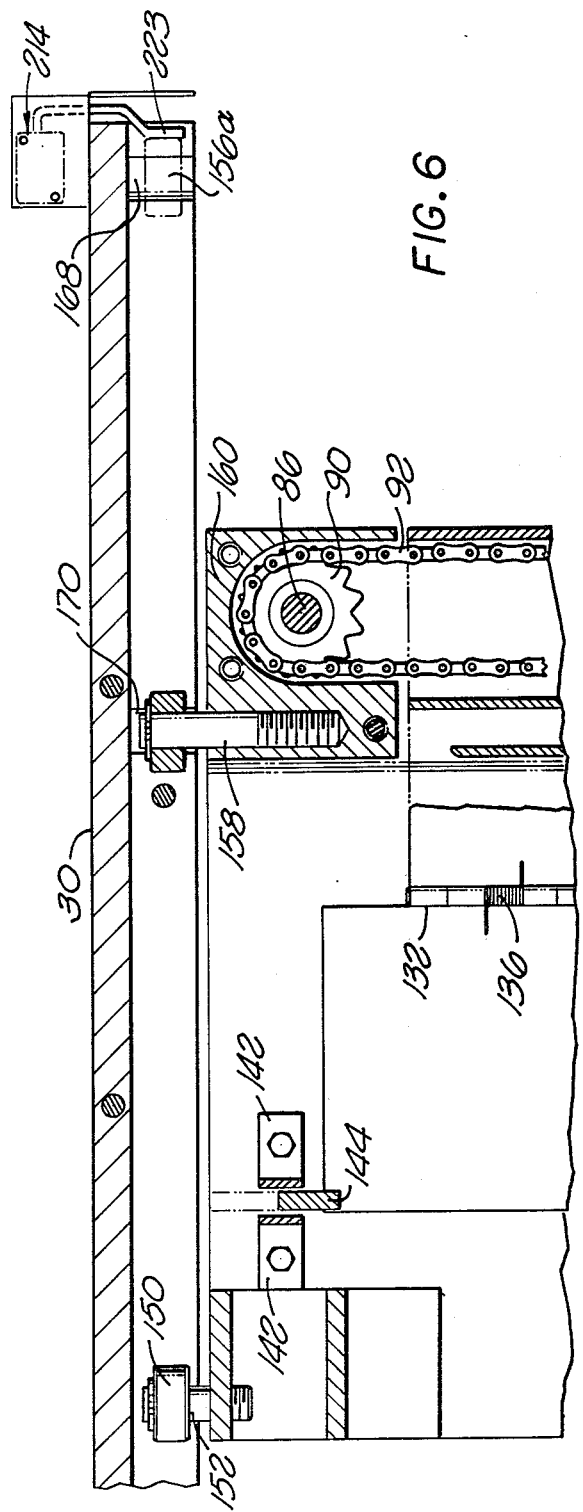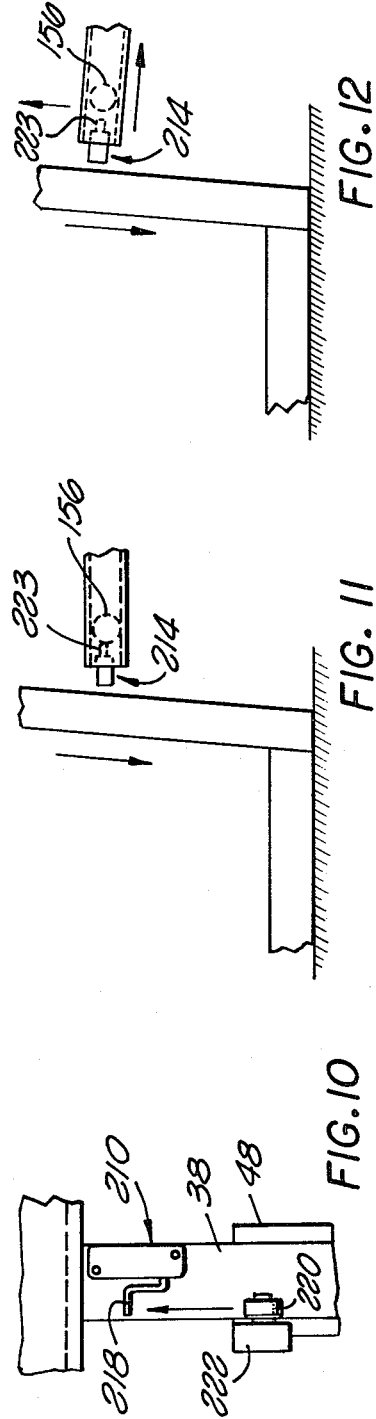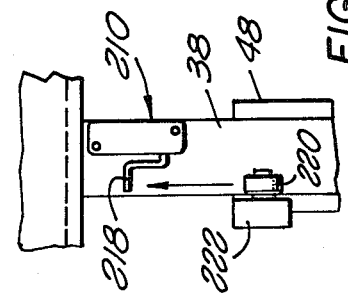

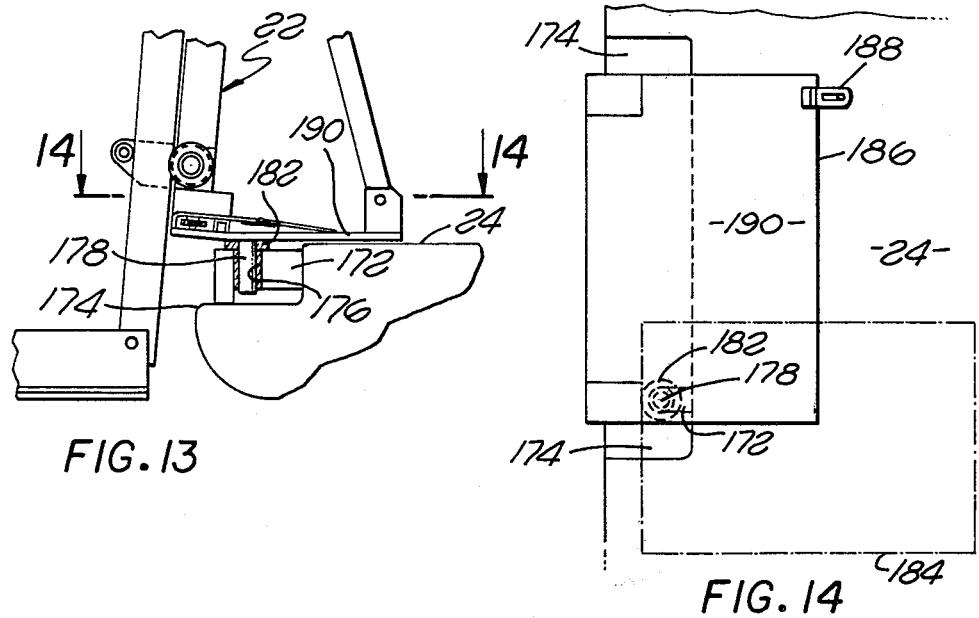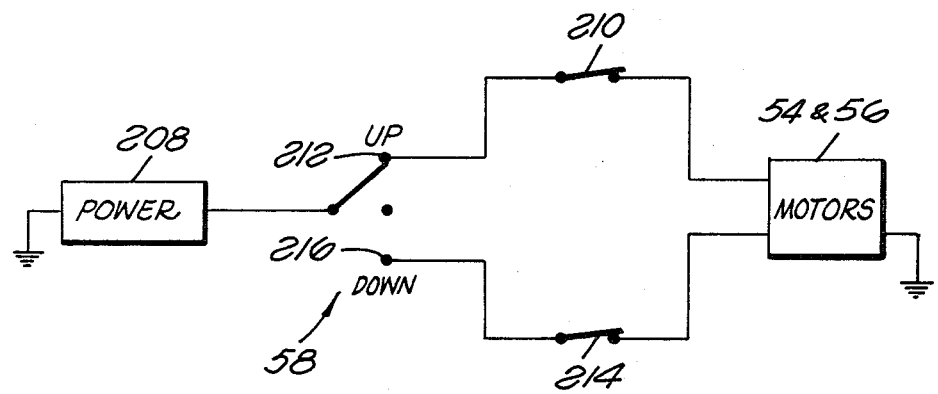

MANUAL WHEELCHAIR LIFT

BACKGROUND OF THE INVENTION

The present invention relates to a lift apparatus and in particular to a dual support post lift apparatus for wheelchairs which is manually movable between a storage position and an operating position and which translationally moves a platform between a raised and lowered operating position.

Various lift apparatus are known and have been made commercially available. Among those are the single support post lift devices in which the support post is fixed to the bed of the vehicle, and the wheelchair or other object being lifted is both translationally moved between a lowered and a raised position and pivotally moved between the raised position and an interior position in the vehicle. Various devices in this general category are illustrated in White, U.S. Pat. No. 2,792,951; Robb, U.S. Pat. No. 3,291,261; Walter, U.S. Pat. No. 3,516,559; Drake, U.S. Pat. No. 4,096,955; Williams, et al., U.S. Pat. No. 3,847,292; and Walter, U.S. Pat. No. 3,516,559.

Other single support post lift devices have also been developed wherein the single support post is not fixed relative to the vehicle but can pivot. Such devices include Landen, U.S. Pat. No. 2,930,499; Southward, et al., U.S. Pat. No. 3,515,294; Adamek, U.S. Pat. No. 3,837,513; and Gates U.S. Pat. No. 4,133,437. However, each of these devices involved sideways platform tilting due to the twisting torque which results as a consequence of lifting a weight such as a wheelchair at a single platform attachment location. Such twisting increases the effective weight which must be lifted and hence increases the required lifting force which must be applied. In addition, each of the above single support post lift apparatus requires separate motions, namely, a vertical motion to lift or lower the wheelchair and a horizontal rotational motion to move the wheelchair and its occupant between the raised position into the interior of the vehicle. By contrast, the present invention includes a dual support post apparatus where the platform is lifted at two front edge locations thereby minimizing the twisting torque and permitting a substantial decrease in the resistance to lifting. Such a decrease in resistance is desirable to enable a lift device to be manually operated in instances where the motive means is inoperable or otherwise when a manual lift apparatus is desired.

Various devices have been developed incorporating dual support structures mounted to the vehicle. For example, in Brown, U.S. Pat. No. 3,305,122, and in Himes, U.S. Pat. No. 3,371,805, dual support posts are interconnected to the vehicle. However, in each of these patents, the support posts are fixed to the vehicle and hence immovable. The raised position of the platform is the storage position and no further movement structure is therefore required.

Other patents incorporating dual support posts attached at two locations along one edge of a platform include Simonelli, et al., U.S. Pat. No. 3,651,965; Fowler, Jr., U.S. Pat. No. 3,710,962; Horowitz, U.S. Pat. No. 3,637,097; and Deacon, U.S. Pat. No. 3,913,759. In each of these patents, however, the support posts are stationary, and movement of the platform between an operating position and a storage position is effected by other means such as pivotal movement about the stationary supporting posts as in the Horowitz patent and the Deacon patent or translational movement relative to the stationary support posts as in the Fowler patent.

Finally, in the Simonelli, et al. patent, the support posts are movable into a storage position, but such movement is by pivotal motion about an axis in the plane of the bed of the vehicle and involves pivotal lifting of the entire lift device.

Although all of the above devices provide certain features and advantages for certain applications, there is still a need for an inexpensive, simple lift device which is suitable for raising and lowering a wheelchair from a vehicle in a safe and secure manner. In the least expensive form of the invention it is therefore desirable to eliminate the motors and provide for manual operation. It will be appreciated that in order to provide a lift apparatus capable of lifting a wheelchair and its occupant through manual cranking of the lift, it is necessary to provide mechanical features which decrease resistance to lifting. In accordance with this objective, the present invention comprises a unique apparatus wherein the platform is movably attached at each corner to a different vertically stationary support post to thereby eliminate the twisting torque and associated increased binding forces.

The present invention also preferably incorporates ball-type lead screws which provide a long gently sloping circular ramp to enable the platform and wheelchair to be more easily lifted (although, of course, more rotations of a crank member are required).

The present invention is further provided with a translational or pivotal means of moving the entire support assembly between the raised outwardly extended operating position and a storage position inside the vehicle without the necessity of supporting and moving the wheelchair during such movement. Hence, the additional weight of the wheelchair and occupant is not carried by the lift apparatus between the storage or interior position and the raised operating position as in other prior art patents.

The present invention also provides a novel interior safety flap mechanism; a novel apparatus for folding the platform into the storage position which allows the lift apparatus to be stored more compactly and also allows a smaller access opening to be used in the pivotal support assembly embodiment of the invention; a novel inboard safety flap apparatus on the platform itself; and a novel switch apparatus which will disable the motor (if one is used) when the platform is in the fully raised position, or is in a nonextended position.

Finally, the present invention incorporates, in one embodiment, a novel translational track mechanism for moving the entire support assembly, including the two vertically stationary posts and associated apparatus, between the operating position and the storage position.

It will, of course, be appreciated that while the present lift apparatus is particularly useful when it is mounted to a vehicle adjacent an access opening, the lift apparatus may also be utilized across any access opening such as the access opening between any two locations where there is a need to go from one vertical level to another. However, for simplicity of explanation reference hereafter is with respect to an access opening of a vehicle.

SUMMARY OF THE INVENTION

The present invention comprises a lift apparatus mountable adjacent an access opening for being selectively moved between a first storage position at a first support surface and an operating position extending beyond the threshold of the access opening for moving an object such as a wheelchair between a raised operating position generally horizontal with the first support surface and a lowered operating position below the first support surface. The lift apparatus comprises a support assembly which has a base plate assembly and a pair of upstanding support members defining a passageway therebetween. Each upstanding support member has a vertically positioned longitudinal channel along its length and each of the support members is mounted to the base plate assembly on opposite sides of the base plate assembly. The support assembly further comprises a pair of lead screws where each lead screw is rotatably mounted in the vertical channel of a different one of the support members between the ends of the respective support members. The support assembly also comprises a platform assembly having a first edge adjacent to the access opening and a pair of coupling posts where each coupling post has a first end attached to the platform assembly at spaced locations along the first edge for providing a passageway therebetween. The coupling posts each have a second end which is movably attached to one of the lead screws for raising and lowering the coupling post and hence the platform assembly, as the lead screws rotate. Means are also provided for mounting the support assembly to the first support surface so that the support assembly is movable between the inside storage position and the operating position wherein the platform assembly extends over the threshold of the access opening with the first edge of the platform assembly parallel to the threshold of the access opening. Finally, the lift apparatus includes a means for selectively and simultaneously rotating the lead screws to raise and lower the platform assembly.

In one embodiment, the means for mounting the support assembly to the first support surface comprises a pivot bracket mounted to the first support surface adjacent one side of the access opening. Means are then fixed to one side of the base plate assembly for pivotally interconnecting the support assembly to the support surface pivot bracket. The support assembly is thus pivotal about the pivot axis between the operating position and the storage position. In this embodiment, a clamping means may also be provided for clamping the other side of the base plate assembly to the bed of the first support surface when the support assembly is in the operating position or in the storage position.

In an alternative embodiment of the present lift apparatus invention, the means for mounting the support assembly to the first support surface comprises a pair of retaining guide members mounted to the bed of the vehicle on opposite sides and perpendicular to the access opening and an interconnection means for attaching the opposite sides of the base plate assembly to the retaining guide members to thereby movably couple the support assembly to the retaining guide members. Hence, the support assembly is translationally movable relative to the retaining guide members between the operating position and the storage position.

A control means may also be provided which includes a first normally open switch positioned for being closed by the interconnection means when the support assembly is in the operating position and for being opened when the platform assembly presses against the ground with more than a predefined amount of force.

The invention may also include a safety flap apparatus having a flap hinged to the base plate assembly across the passageway whereby the flap is rotatable between a nonobstructing position and an obstructing position. A spring means is provided for positioning the flap in the normally obstructing position and a stop is provided for maintaining the flap in the obstructing position for preventing movement of the object from the first support surface across the threshold of the access opening along the passageway. A latching means movable between a latched and an unlatched position is provided where the latch means is weighted for being in the normally latched position for holding the flap in a nonobstructing position. Finally, means for moving the latching means from the normally latched position to the unlatched position are provided whereby the flap is rotated from the obstructing position to the nonobstructing position for being latched by the latching means when the object moves through the passageway from the lift platform assembly to the first support surface.

BRIEF DESCRIPTION OF THE DRAWINGS

A complete understanding of the present invention and the above and other objects and advantages thereof may be gained from a consideration of the following description of the preferred embodiments taken in conjunction with the accompanying drawings in which:

FIG. 3 is a side cross-sectional view of the lift apparatus through Section 3—3 of FIG. 1;

FIG. 4 is a top cross-sectional view through Section 4—4 in FIG. 3;

FIG. 5 is also a cross-sectional view through Section 5—5 of FIG. 2;

FIG. 6 is a partial cross-sectional view through Section 6—6 of FIG. 5;

FIG. 7 is a cross-sectional view of the roller assembly through Section 7—7 of FIG. 5;

FIG. 8 is a front cross-sectional view through Section 8—8 of FIG. 5 showing the safety flap latch mechanism;

FIG. 9 is a cross-sectional view through Section 9—9 of FIG. 5 illustrating the mounting arrangement by which the support assembly is movably mounted to the vehicle;

FIG. 10 is a simplified front plan view illustrating the operation of the UP cut-off switch;

FIGS. 11 and 12 are simplified side views illustrating the operation of the DOWN cut-off switch;

FIG. 13 is a simplified side plan view illustrating the pivot interconnection mechanism emboidment by which the support assembly is movably mounted to the vehicle;

FIG. 14 is a simplified top plan view of the lift apparatus illustrating the movement of the lift apparatus between the operating position and the storage position in the pivot mounting bracket embodiment of the invention;

FIG. 15 is a simplified electrical schematic drawing illustrating the manually operable toggle switch and the UP and DOWN cut-off switch arrangement in accordance with the invention.

DETAILED DESCRIPTION

Figure 1:
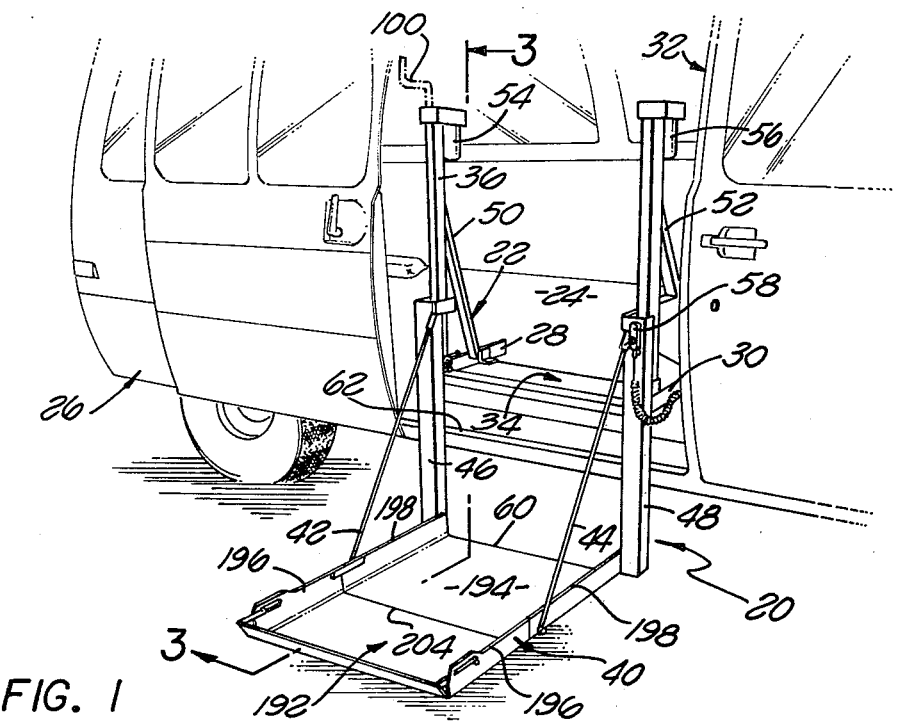
FIG. 1 is a pictorial view of a lift apparatus mounted in a vehicle in accordance with the invention.
Figure 2:
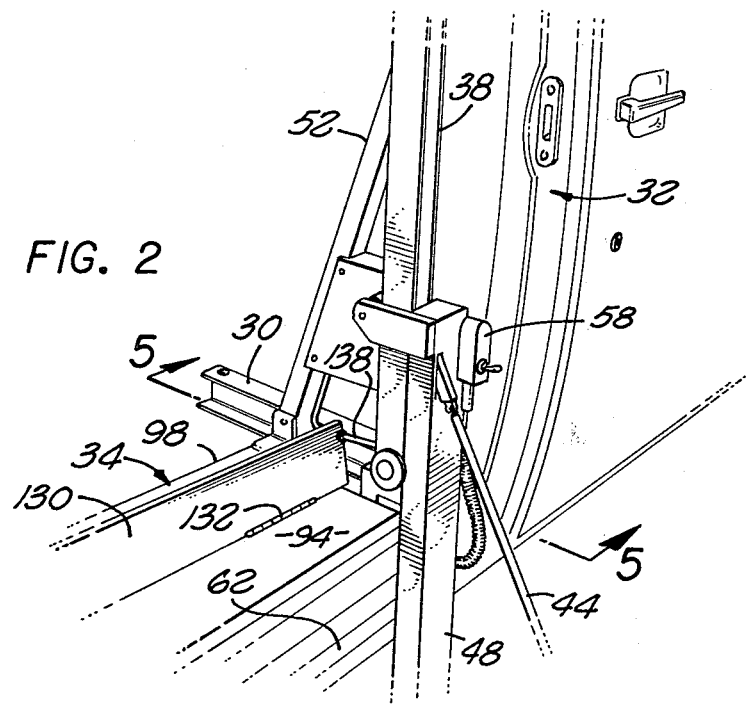
FIG. 2 is a pictorial view of a detail of the lift apparatus shown in FIG. 1.

A lift apparatus 20 in accordance with the present invention is illustrated in FIGS. 1 and 2 and comprises a support assembly 22 which is movably interconnected to the bed 24 of a vehicle 26 by an interconnection mechanism. In one embodiment, the interconnection mechanism may include a pair of retaining guide members or tracks 28 and 30 positioned on either side of an access opening 32 in the vehicle 26. Alternatively, the interconnection mechanism may comprise a pivot bracket and mounting pin arrangement such as that illustrated in FIGS. 13 and 14 to be described hereafter.

The support assembly 22 generally comprises a base plate assembly 34; a pair of upstanding support members 36 and 38 which are attached to opposite sides of the base plate assembly 34; a pair of coupling posts 46 and 48 which are movably attached to the upstanding support members 36 and 38 respectively in a manner to be described hereafter; and a platform assembly 40 which is pivotally attached to the lower ends and between the coupling posts 46 and 48. The platform assembly 40 may be folded upwardly into a storage position in a manner to be described hereafter but is prevented from pivoting downward below a horizontal operating position by a pair of flexible straps or cables 42 and 44 attached respectively between the coupling post 46 and the platform assembly 40 and the coupling post 48 and the platform assembly 40.

The support assembly 22 may also include a brace 50 interconnected between the base plate assembly 34 and the upstanding support member 36 and a brace 52 interconnected between the base assembly 34 and the upstanding support member 38 to maintain the upstanding support members 36 and 38 rigid and immovable relative to the base plate assembly 34.

The support assembly 22 also includes apparatus interconnected for raising and lowering the platform assembly 40 along the two upstanding support members 36 and 38. Thus, a pair of motors 54 and 56 may be attached to the top of the upstanding support members 36 and 38 and may be mechanically interconnected to rotate a lead screw longitudinally positioned in each of the upstanding support members 36 and 38 in a manner to be described hereafter.

In operation, an object such as a wheelchair with an occupant, is first moved onto the platform assembly 40 while the platform assembly is in a lowered operating position such as that illustrated in FIG. 1. A control toggle switch 58 may then be closed to thereby actuate the motors 56 and 58 to cause the platform to move upwardly relative to the upstanding support members 36 and 38. When the first or front edge 60 of the platform assembly 40 is substantially level with the surface of the base plate assembly 34, a switch, to be hereafter described, is opened, thereby turning the motors 54 and 56 off. The wheelchair is then rolled across the threshold 62 of the access opening 32 and into the interior of the vehicle 26. After the wheelchair moves from the platform assembly 40, the lift apparatus 20 may be moved from the raised operating position to a stored position inside the vehicle by pivoting the platform assembly 40 into a folded configuration and moving the entire support assembly 22 inwardly along the retaining guide members or tracks 28 and 30. In an alternative embodiment, the entire support assembly 22 may be rotated into the vehicle about a pivot bracket on one side of the access opening such as that shown in FIGS. 13 and 14.

Referring to FIG. 3, the upstanding support member 36 comprises a longitudinal channel member which has an upper end lead screw mount 64 at the top of the channel member and a lower end lead screw mount 66 at the lower end of the channel member. A lead screw 68 is then rotatably attached between the upper and lower lead screw mounts 64 and 66. The coupling post 46 is interconnected to the lead screw 68 in the upstanding support member 36 by an attachment mechanism such as the attachment mechanism illustrated in FIG. 4. Specifically, the coupling post 46 is interconnected to the lead screw 68 utilizing a U-shaped cross-section attachment bracket 70 which is bolted by bolt 72 to the upper end of the coupling post 46. A pair of retention members 74 are then attached to the attachment bracket 70 by bolting, welding or other suitable means. The retention members 74 each have an outwardly extending portion 78 which extends into the valleys of the lead screw 68. Thus, as the lead screw 68 rotates, the outwardly extending portions 78 move up or down along the lead screw 68 in the conventional well-known manner. Of course, it will be appreciated that any appropriate outwardly extending portion 78 may be utilized. For example, the outwardly extending portions 78 may actually be ball bearings and the lead screw 68 may be a ball lead screw.

Referring again to FIG. 3, the lead screw 68 may be rotated by providing a pulley mechanism 80 which is fixed to the upper end of the lead screw 68 and a second pulley 82 which is fixed to the axle of the motor 54. The pulleys 80 and 82 are then interconnected by a belt, chain or other appropriate never-ending interconnection device 84. A bracket and pulley arrangement similar to that described in conjunction with FIGS. 3 and 4 is also provided to interconnect the motor 56, a lead screw 86 mounted between the ends of the support member 38, and the coupling post 48 of FIGS. 1 and 7.

In the preferred embodiment a brake apparatus 83 such as the FSB 003 brake sold by Inertia Dynamics of Collinsville, Conn., is attached to the shaft of at least one of the motors such as the motor 54, to prevent the mere weight of the platform (either by itself or with an object thereon) from causing the lead screws to rotate thus causing the platform to slowly lower when the motors turn off. The brake 83 prevents such downward movement by preventing rotation of the motor shaft except under positive motive force applied by the motor itself. The brake 83 consequently provides a valuable safety feature for the present lift apparatus.

A sprocket, pulley or other suitable drive mechanism 88 (FIG. 3) is fixed to the opposite lower end of the lead screw 68 and rotates as the lead screw 68 rotates. Similarly, as shown in FIGS. 5 and 6, a corresponding sprocket pulley or other suitable drive mechanism 90 is fixed to the opposite end of the lead screw 86. In order to synchronize the rotation of the lead screw 68 mounted to the support member 36 and the lead screw 86 mounted to the support member 38 so that both sides of the platform will be raised and lowered at ther same rate, without side-to-side tilting, a chain, timing belt or other appropriate never-ending means 92 is provided to interconnect the sprocket 88 on the lower end of the lead screw 68 and the sprocket 90 on the lower end of the lead screw 86. The sprockets 88 and 90 and the chain 92 are positioned beneath a top surface of a ramp plate 94 (FIG. 5) of the base plate assembly 34 above the bed of the vehicle in a space 96 between a base plate 98 and the ramp plate 94. Because of this mechanical interconnection, the motors 54 and 56 are synchronized to one another. The lead screws 68 and 86 are thus forced to rotate at the same rate by the sprocket and chain mechanism including the sprockets 88 and 90 and the chain 92 (see FIGS. 3, 5 and 6) which comprise the synchronization means of the present invention.

Although the above description has been made with reference to a pair of motors which are coupled to cause the two lead screws to rotate, the present invention may incorporate but a single motor or may provide a hand-crank mechanism 100, as shown in FIG. 1, coupled to the top end of one of the lead screws.

The present invention also comprises an upper roller apparatus interconnected to the top of each coupling post and a lower roller apparatus fixed to the lower portion of each upstanding support member. Each upper roller apparatus has a roller which rolls along one surface of the adjacent support member and each lower roller apparatus has a plurality of rollers against which the adjacent coupling post rolls. Referring by way of illustration to FIGS. 3 and 4, the coupling post 46 includes an upper roller apparatus 102 comprising a bracket 104 which is attached to the coupling post 46 by bolting, welding, or the like; an axle 106 fixed to the bracket 104; and a roller 108 which is rotatably attached to the axle 106. The bracket 104, axle 106 and roller 108 are configured and spaced so that the roller 106 rolls against the rear surface 110 of the upstanding support member 36 as the coupling post 46 moves up and down in response to the rotation of the lead screw 68. A similar upper roller apparatus is also interconnected to the top of the other coupling post 48.

Referring to FIGS. 5 and 7, an illustrative lower roller apparatus 112 in accordance with the invention may comprise a pair of axle members 114 and 116 to which rollers 118 and 120 are rotatably attached with suitable bearings 122 and 124 therebetween. The two axles 114 and 116 are fixed to a lower portion of the support member 38. For example, each of the axles 114 and 116 may have a threaded end which is screwed into a threaded orifice in the lower portion of the support member 38 as shown in FIG. 7. Each of the rollers 118 and 120 has an alignment flange 126 and 128 respectively which serves to maintain lateral alignment of the coupling post 48 with the support member 28.

In operation, the coupling post 48 moves against the surface of the two rollers 118 and 120 inside the alignment flanges 126 and 128, so that the rollers 118 and 120 rotate as the coupling post 48 moves longitudinally relative to the support member 38. A similar mechanism is provided on the support member 36.

The upper and lower roller mechanisms assist in reducing the friction caused by the relative motion of the coupling posts against the upstanding support members to thus enable the present invention to have smaller, less expensive motors or to be manually operable with a crank or the like.

A third roller may also be provided to hold the coupling post 48 against the lower rollers 118 and 120. Specifically, a flange 230 is interconnected to the support member 38 by the axle bolt 114 and extends outwardly beyond the back surface 232 of the coupling post 48. A roller 234 is then rotatably attached to an axle 236 which is fixed to the flange 230 so that the roller 234 is in position to roll against the surface 232 of the coupling post 48 to thereby hold the coupling post 48 against the rollers 118 and 120.

Referring now to FIGS. 2 and 5, the base plate assembly 34 comprises a base plate 98 which is movable relative to the bed of the vehicle; a ramp plate 94 which is fixed to the base plate and positioned to provide a space 96 between the ramp plate 94 and the base plate 98; and a flap 130 which is hinged by hinges 132 to an interior edge 134 of the ramp plate 94. The previously described sprocket and chain mechanism making up the synchronization means is then positioned in the space 96 between the ramp plate 94 and the base plate 98. The ramp plate 94 and the flap 130 as well as the interior edge of the base plate 98 comprise the surface over which the wheelchair rolls to either mount onto or dismount from the platform assembly 40 (FIG. 1).

In accordance with the invention, a safety flap apparatus comprises the flap 130, the hinges 132, a spring 136 integral with the hinges 132 (see FIG. 6), a stop 138, and a release mechanism 140. The flap 130 is interconnected by the hinges 132 to the ramp plate 94. The springs 136 are integrally coupled to the hinges 132 so that the flap 130 will rotate in a clockwise manner until it assumes a substantially vertical orientation against the stop 138 which is attached to one or both support members 36 and 38. Because the springs 136 cause the flap 130 to be in the normally vertical position against the stops 138, a release mechanism 140 is provided to hold the flap 130 in the lowered position so that an object such as a wheelchair can move from the interior of the vehicle outwardly across the flap 130 and onto the platform assembly 40. Otherwise the flap 130 prevents the wheelchair from moving across the threshold of the vehicle.

Referring to FIGS. 5, 6 and 8, the release mechanism 140 comprises a pair of mounting flanges 142 between which a gravity latch member 144 is pivotally mounted by an axle 146. A release link 148 is then attached to the gravity latch member 144 so that when the release link 148 is moved upwardly, e.g., by manually pulling, the gravity latch member 144 rotates to thereby release the flap 130 and allow the flap 130 to rotate upwardly into a generally vertical position against the stop 138. A wheelchair or other object will thus be prevented from rolling across the threshold of the access opening when the flap 130 is in a generally vertical position against the stop 138. Thus, when it is desired to prevent a wheelchair inside the vehicle from inadvertently rolling across the threshold such as when the platform assembly 40 is in the lowered operating position, it is merely necessary to release the gravity latch 144 by pulling on the release link 148. The gravity latch member 144 thereupon rotates in a counter-clockwise direction about the mounting axle 146 until the flap 130 is released and moves under the force of the spring 136 to a generally vertical obstructing position against the stop 138. To return the flap to a nonobstructing position, it is merely necessary to push the flap 130 counter-clockwise until the side of the flap 130 comes in contact with the sloped surface 150 of the gravity latch member 144. Continued downward pressure against the sloped surface 150 causes the gravity latch member 144 to rotate in a counter-clockwise direction until the flap 130 is in the fully lowered position with its longitudinal edge against the base plate 98. When the flap 130 has reached this position, the gravity latch member 144 will move clockwise under the force of gravity into a latching position thereby holding the flap 130 in the lowered position.

This manual movement of the flap 130 from an obstructing position to a nonobstructing position may be accomplished by manually pushing down on the flap 130 or by moving an object such as a wheelchair from the platform assembly 40 across the threshold and into the interior of the vehicle at which time the wheels will come in contact with the flap 130 and will force the flap 130 into the nonobstructing position.

The gravity latch member 144 may be weighted, for example, at a location near its connection point to the release link 148 so that the gravity latch member will automatically assume a latching position under the force of gravity when the release link is not being manually lifted. Alternatively, it will be appreciated that a spring mechanism may be incorporated as part of the mounting axle 146 to thereby maintain the gravity latch member 144 in a normally latching position.

As previously indicated in one embodiment of the invention, the interconnection mechanism by which the support assembly 22 is movably attached to the vehicle includes the pair of retaining guide members 28 and 30 fixed to the bed of the vehicle on either side of the access opening. Rollers are rotatably attached to opposite sides of the base plate assembly and are positioned to roll along and be retained by the respective retaining guide members 28 and 30. One such retaining guide member and roller mechanism is illustrated in FIGS. 5, 6, and 9. However, it will be appreciated that a mirror image structure is provided on the opposite side of the lift apparatus as well.

Referring to FIGS. 5, 6, and 9, a roller 150 is rotatably attached to an axle 152 which is fixed to a rear bracket 154 by a bolt or any other suitable means. The rear bracket 154 is fixed to the top of the base plate 98 by welding, bolting or any other suitable means.

Similarly, a front roller 156 is rotatably attached to an axle 158 which is mounted to a front bracket member 160. The front bracket member 160 is also fixed to the base plate 98 at a front corner position. Similar front and rear roller mechanisms are provided on the opposite edge of the base plate assembly along edges which are perpendicular to the threshold of the vehicle.

The rollers 150 and 156 are positioned to extend outwardly from the base plate assembly 34 to be retained in the retaining guide member 30 which comprises a lower retention plate 162 and an upper retention plate 164 interconnected in a generally U-shaped configuration by a vertical connecting plate 166. The base plate assembly 34 is translationally movable along the retaining guide member 30 and the opposite retaining guide member 28 (FIGS. 1 and 3) so that the entire support assembly 22 including the base plate assembly 34, the platform assembly 40, the support members 36 and 38 and the coupling posts 46 and 48 translationally move together between the interior storage position and the outwardly extending operating position. Thus, the support assembly, as partially illustrated in FIGS. 5 and 6, is shown in the storage position with the operating position being shown by phantom rollers 156a and 150a.

In one embodiment of the invention one or more positioning grooves such as grooves 168 and 170 may be positioned in the surface of each guide plate of the retaining guide members 28 and 30. Thus, when the platform assembly is moved into the outwardly extending operating position, the front roller 156 will move into and be retained by the retaining groove 168 and when the support assembly is moved into the stored position the roller 156 will be retained and held by the retaining groove 170. Additional retaining grooves may also be provided for the roller 150.

Referring now to FIGS. 13 and 14, an alternative means of movably interconnecting the support assembly to the vehicle whereby the support assembly can be moved from a storage position to an outwardly extending operating position is illustrated. In this second embodiment, the support assembly 22 is pivotally moved between a storage position and an operating position rather than being translationally moved as in the prior embodiment. More specifically, referring to FIG. 13, a pivot bracket 172 is mounted in the step well 174 of the vehicle at one side of the access opening. The pivot bracket 172 is provided with a vertically disposed orifice 176 into which a shaft 178 fixed to the support assembly 22, extends. Appropriate spacers 182 may then be provided to maintain the support assembly slightly above the bed 24 of the vehicle so that the support assembly will be freely rotatable about the axis of the shaft 178 between a storage position 184, shown in phantom in FIG. 14, and an operating position 186, shown in solid lines in FIG. 14. In one embodiment, a clamping device 188 or latching device 188 is interconnected between the bed of the vehicle 24 and the base plate 190 at the corner of the base plate 190 opposite the pivot corner about which the support assembly 22 pivots. This clamping device 188, which may be a bayonet lock which is inserted into a keyhole slot in the bed of the vehicle, prevents the slight twisting which results when an object is positioned on the platform assembly and the platform is supported at only one corner.

In an alternative embodiment, a steel reinforcing plate may be welded to the underneath surface of the vehicle bed with a bolt or other similar pivot axis member attached to the base plate to extend through orifices in the bed of the vehicle and in the reinforcing plate. The base plate is then pivotally attached by a nut or other suitable means to the reinforcing plate to be held thereby.

Referring again to FIGS. 1 and 3, the platform assembly 40 may, in one embodiment, comprise an outer platform member 192 and an inner platform member 194. The outer platform member 192 has a pair of guide curbs 196 which are positioned to extend upwardly from the top or support surface of the outer platform member 192. The inner platform member 194 is similarly configured having a pair of upstanding guide curbs 198 on opposite sides of the inner platform member 194. The outer platform member 192 is pivotally attached to the inner platform member 194 by a pair of links, one on each side of the platform assembly 40, interconnecting the longitudinally adjacent guide curbs 196 and 198 of the outer and inner platform members 192 and 194 respectively.

Specifically, each link apparatus has a link 200 which is fixed by welding or the like to a top, inside edge region of one of the guide curbs 196 so that the link 200 is angled rearwardly and upwardly from the outer platform member 192 to extend above the top edge of the guide curb 196. The unattached end of the link 200 is then pivotally attached to a connecting axle 202 which is fixed to a forwardly and upwardly angled link 201 which is fixed by welding or the like to the top edge of the guide curb 198 of the inner platform member 194. The axle 202 is positioned in vertical alignment with the front edge 204 of the inner platform member 194 to allow free pivotal movement of the outer platform member 192 about the pivot axle 202. A plate 203 is welded to the bottom of the inner platform member 194 to extend beyond the front edge 204 to prevent movement of the outer platform member 196 below a plane colinear with the inner platform member 194.

The inner platform member 194 is pivotally connected by one of a pair of axles 206 to the coupling post 46 and similarly connected by the other of the pair of axles 206 (not shown) to the coupling post 48. Thus, the outer platform member 192 may be pivoted to a storage position overlying the inner platform member 194 and the folded configuration of the inner and outer platform members additionally folded about the pivot axles 206 to a vertical orientation substantially in alignment with the coupling posts 46 and 48 and the support members 36 and 38 to thereby eliminates the amount of view which the lift apparatus obstructs in the vehicle and also allows the length of the platform to be increased.

As previously indicated, the present invention as above described is operable by providing a crank apparatus 100 (FIG. 1) to the top end of one of the lead screws. The lift apparatus can then be raised or lowered by simply manually rotating the crank apparatus. Alternatively, the lead screws of the present invention may be rotated in response to energizing of one or two electric motors. When electric motors are utilized appropriate electrical switching controls may be provided as illustrated in FIGS. 5, 6, 10, 11, 12 and 15. The crank may also be provided in this embodiment to allow the platform to be raised or lowered if the motors fail.

Referring first to FIG. 15, a simplified schematic of electrical circuitry which may be incorporated in the present invention is shown to illustrate the operation of the switching circuitry. Specifically, a manually operated toggle switch 58 is coupled between the motors 54 and 56 and the power supply 208. The toggle switch 58 may be switched to an UP position whereby the motors rotate to cause the lift apparatus to lift the platform, to a DOWN position in which case the motors rotate in the opposite direction to cause the lift apparatus to lower the platform, or to a NEUTRAL position in which case the platform is neither raised nor lowered but rather remains stationary. An UP motion cut-off switch 210 is coupled in series between the UP terminal 212 of the toggle switch 58 and the motors 54 and 56 and a DOWN cut-off switch 214 is coupled in series between the DOWN terminal 216 of the toggle switch 58 and the motors 54 and 56. Thus, if the toggle switch 58 is moved to the UP position, the lift commences upward movement until the UP cut-off switch 210 is opened. Thereafter, further motion of the lift in the upward direction is not possible until the UP cut-off switch 210 is again closed. Similarly, when the toggle switch is switched to the DOWN position, the lift apparatus moves downwardly until the DOWN cut-off switch 214 is opened. Thereafter, the lift will not again move downwardly until the DOWN cut-off switch 214 is again closed.

Referring to FIG. 10, in the preferred embodiment the UP cut-off switch 210 is a normally closed switch positioned at the top of one of the support members such as the support member 38. The UP control switch 210 has an actuating arm 218 which is positioned to be contacted by a roller 220 attached to coupling post 48 by plate 222, similar to the roller 108 which is attached by plate 104 to the coupling post 46 (FIG. 4). Thus, when the roller 220 moves upwardly into contacting relationship with the arm 218 of the UP control switch 210, the UP control switch 210 will be opened and further upward movement will be prevented.

Similarly, as shown in FIGS. 5, 6, 11 and 12, the DOWN cut-off switch 214 is positioned at the front edge of one of the retaining guide members or tracks such as the retaining guide member 30. The DOWN cut-off switch 214 is preferably a normally opened switch which is positioned to be contacted by the front roller 156 when the support assembly 22 has been moved into the operating position. Upon being contacted by the front roller 156, the switch actuating arm 223 causes the normally opened switch to close thus enabling downward movement of the platform. Hence, the switch 214 being normally opened, prevents the platform from moving downwardly unless the support assembly is in the operating position.

The switch actuating arm 222 is also positioned to prevent downward movement of the platform beyond a certain point and hence servés as an automatic shut-off switch. Referring to FIGS. 11 and 12, as the platform assembly moves downward, the roller 156 presses against the actuating arm 223 of the switch 214 as illustrated in FIG. 11 because the support assembly is in the operating position to thereby cause the switch 214 to close and enable downward movement of the platform assembly. However, when the platform assembly comes into contact with the ground, the motors will continue rotating, causing the lift apparatus to act as a jack which slightly lifts the vehicle on one side. This slight movement causes the roller 156 to move backwardly along the retaining guide member 30 moving away from the actuating arm 223 to thereby cause the switch 214 to open. This prevents power from being supplied to the motors and further downward movement of the lift will consequently not occur. This result is illustrated in FIG. 12 which shows the downward motion of the lift which results in a slight upward movement of the vehicle (and the retaining guide member attached to the vehicle) which in turn causes the roller 156 to break contact with the switch contact 214 to thereby open the switch 214.

While the present invention has been particularly shown and described with reference to preferred embodiments, it will be understood by those skilled in the art that the foregoing and other changes in form and details may be made without departing from the spirit and scope of the invention.

What is claimed:

1. A lift apparatus for being mounted to a first support surface adjacent the threshold of an access opening thereof for being selectively located at a storage position and an operating position, the lift apparatus operable for moving an object such as a wheelchair between a raised position generally horizontal with the first support surface, and a lowered position below the first support surface and adjacent a second support surface when the lift apparatus is in the operating position, the lift apparatus comprising:
   a movable support assembly comprising:
      a base plate assembly;
      a pair of upstanding support members defining a passageway therebetween, one of the support members mounted to the base plate assembly on one side thereof and the other of the support members mounted to the base plate assembly on the other side thereof;

a pair of lead screws, each rotatably mounted between the ends of the one of the support members;

a platform assembly having a first edge;

a pair of coupling posts, each coupling post having a first end coupled to the platform assembly at spaced locations along the first edge thereof for permitting passageway therebetween, the coupling posts each having a second end movably attached to one of the lead screws for raising and lowering the coupling posts to move the platform assembly relative to the support members between the raised and lowered positions as the lead screws rotate;

means for movably mounting the support assembly to the first support surface, the support assembly being movable in a plane substantially parallel to the plane of the support surface between the storage position and the operating position whereby the platform assembly extends over the threshold of the access opening with the first edge of the platform assembly being parallel to the threshold of the access opening when the support assembly is in the operating position and the platform assembly is in the raised position; and means for selectively, simultaneously, rotating the lead screws for raising and lowering the platform assembly between the raised and lowered positions when the support assembly is in the operating position.

2. The lift apparatus of claim 1 wherein the means for movably mounting the support assembly to the first support surface comprises:

a pivot bracket mounted to the first support surface adjacent one side of the access opening for defining a pivot axis substantially perpendicular to the first support surface;

means fixed to one side of the base plate assembly for pivotally interconnecting the support assembly to the pivot bracket, the support assembly being pivotal about the pivot axis between the operating position and the storage position.

3. The lift apparatus of claim 2 further comprising: clamping means for clamping the other side of the base plate assembly to the first support surface.

4. The lift apparatus of claim 1 wherein the means for movably mounting the support assembly to the first support surface comprises:

a pair of retaining guide members mounted to the first support surface on opposite sides and perpendicular to the threshold of the access opening;

interconnection means attached to opposite sides of the base plate assembly perpendicular to the first edge of the platform for movably coupling the support assembly to the retaining guide members, the support assembly being translationally movable relative to the retaining guide members between the operating position and the storage position.

5. The lift apparatus of claim 4 further comprising control means which comprises:

a first normally opened switch positioned in one of the retaining guide members for being closed by the interconnection means when the support assembly is in the operating position and for being opened in response to movement of the interconnection means away from the first switch when the platform assembly presses against a second support with more than a predefined amount of force.

6. The lift apparatus of claim 4 wherein each retaining guide member comprises:

a channel member comprising:
an upper retention plate and
a lower guide plate; and
the interconnection means attached to the opposite sides of the base plate comprises, on each opposite side:
a pair of rotatably mounted rollers positioned in the adjacent channel for being retained between the upper retention plate and the lower guide plate.

7. The lift apparatus of claim 6, wherein the lower guide plate has at least one transverse positioning groove for receiving one of the rollers to position and retain the support assembly in at least one preselected position.

8. The lift apparatus of claims 1, 2, or 4, wherein the means for rotating the lead screws comprises:

at least one motor, each motor interconnected to rotate the lead screw positioned in one of the upstanding support members; and synchronizing means for causing the pair of lead screws to rotate at the same rate.

9. The lift apparatus of claim 8 wherein the base plate assembly comprises:

a ramp plate positioned for defining a central space parallel to the first edge of the platform assembly between the first support surface and the ramp plate; and the synchronizing means comprises:

a pair of sprocket devices, one on one of the ends of each lead screw and a belt apparatus interconnecting the sprocket devices and positioned for moving through the central space.

10. The lift apparatus of claims 1, 2 or 4, further comprising actuating means for rendering the means for rotating the lead srews operable only when the support assembly is in the operating position.

11. The lift apparatus of claims 1, 2 or 4, further comprising:

a first roller mounting apparatus attached to one end of each support member adjacent to the base plate assembly;

at least one roller rotatably mounted on each first roller mounting apparatus for rolling along a surface of one of the coupling posts as the coupling post moves in response to the rotation of the lead screws;

a second roller mounting apparatus attached to the end of each coupling post remote from the end to which the platform assembly is attached;

at least one roller rotatably mounted on each second roller mounting apparatus for rolling along a surface of one of the support members as the coupling post moves in response to the rotation of the lead screws.

12. The lift apparatus of claims 1, 2, 3, 4, 5, 6, or 7, further comprising a safety flap apparatus comprising:

a flap hinged to the base plate assembly across the passageway, the flap being rotatable between a nonobstructing position and an obstructing position;

a spring means for positioning the flap normally in the obstructing position;

stop means for maintaining the flap in the obstructing position for preventing movement of an object across the threshold of the access opening along the passageway;

latching means movable between a latched and an unlatched position, the latch means being in a normally latched position for holding the flap in the nonobstructing position; and means for moving the latching means from the normally latched position to the unlatched position, the flap rotating from the obstructing position to the nonobstructing position for being latched by the latching means when an object moves through the passageway from the lift platform assembly to the first support surface.

13. The lift apparatus of claims 1, 2, 3, 4, 5, 6 or 7 wherein the platform assembly comprises:

an inner platform member having the first edge coupled to the coupling posts;

an outer platform member having a second edge oriented parallel to the first edge, the inner and outer platform members each having a load bearing surface and a pair of guide curbs aligned perpendicular to the first edge and positioned to extend from the load bearing surface on opposite sides thereof;

a pair of connecting link apparatus, each having a first link fixed to the side of one of the outer platform member guide curbs and a second link fixed to the top edge of one of the inner platform member guide curbs, the first and second links being pivotally coupled to one another at a location spaced from the top edges of the inner and outer platform guide curbs; and means for pivotally connecting the inner platform member to the pair of coupling posts, whereby the platform assembly is pivotal between a folded position and an unfolded, operating position, the first and second support surfaces being coplanar in the unfolded operating position with the second edge of the outer platform member supported against the edge of the inner platform member opposite the first edge, the load bearing surfaces of the inner and outer platform members being in facing relationship to each other in the folded position.

14. A lift apparatus for being mounted to a first support surface adjacent an access opening having a threshold for moving an object, such as a wheelchair, from the first support surface to the lift apparatus, the lift apparatus being movable between a raised operating position beyond the threshold of the access opening but generally horizontal with the first support surface, and a lowered operating position adjacent a second support surface below the first support surface, the lift apparatus comprising:

mounting means attached to the first support surface;

a support assembly coupled to the mounting means for being movable in a plane parallel to the plane of the first support surface between a stored position and an outwardly projecting operating position, the support assembly comprising:

a vertically stationary assembly comprising a spaced pair of upright support members, a lead screw rotatably mounted to each upright support member, the lead screws interconnected for being rotated at the same rate of rotation, and means for rotating the lead screws; and a vertically movable platform assembly comprising a pair of coupling posts interconnected to the lead screws for being raised and lowered relative to the vertically stationary assembly in response to rotation of the lead screws, and a platform attached to one end of each of the coupling posts; and control means for selectively activating the means for rotating the lead screws to raise or lower the platform assembly.

15. The lift apparatus of claim 14 further comprising:

a pivot bracket defining a pivot axis mounted to the vehicle adjacent one side of the access opening;

means fixed to one side of the support assembly for pivotally interconnecting the support assembly to the first support surface pivot bracket, the support assembly being pivotal about the pivot axis in a plane parallel to the first support surface between the operating position and the storage position.

16. A lift apparatus for being mounted to a first support surface adjacent to an access opening having a threshold for being selectively located at a storage position and an operating position for moving an object such as a wheelchair between a raised operating position generally horizontal with the first support surface, and a lowered operating position adjacent a second support surface below the first support surface, the lift apparatus comprising:

a support assembly comprising:

a base plate assembly;

a pair of upstanding support members defining a passageway therebetween, one of the support members mounted to the base plate assembly on one side thereof and the other of the support members mounted to the base plate assembly on the other side thereof;

a platform assembly having a first edge adjacent to the vehicle;

a pair of coupling posts, each coupling post having a first end coupled to the platform assembly at spaced locations along the first edge thereof for permitting passageway therebetween;

means for movably attaching a second end of each coupling post to a different one of the support members for translationally raising and lowering the coupling posts and platform assembly relative to the support members; and means for movably mounting the support assembly relative to the first support surface, the support assembly being movable between the storage position and the operating position in which the platform assembly extends over the threshold of the access opening thereof with the first edge of the platform assembly being parallel to the threshold of the access opening.

17. The lift apparatus of claim 16 wherein the means for movably mounting the support assembly to the first support surface comprises:

a pivot bracket defining a pivot axis mounted adjacent the first support surface adjacent one side of the access opening;

means fixed to one side of the base plate assembly for pivotally interconnecting the support assembly to the pivot bracket, the support assembly being pivotal about the pivot axis between the operating position and the stored position.

18. The lift apparatus of claim 17 further comprising:

clamping means for clamping the other side of the base plate assembly to the first support surface.

19. The lift apparatus of claim 16 wherein the means for movably mounting the support assembly to the first support surface comprises:

a pair of retaining guide members mounted to the bed of the vehicle on opposite sides and perpendicular to the threshold of the access opening;

interconnection means attached to opposite sides of the base plate assembly perpendicular to the first edge of the platform for movably coupling the support assembly to the retaining guide members, the support assembly being translationally movable relative to the retaining guide members between the operating position and the storage position.

20. A safety flap apparatus for a support surface having an access opening with a threshold defining a passageway through which an object, such as a wheelchair, can be moved to enter or exit the support surface, the safety flap apparatus comprising:

a flap pivotally mounted adjacent to the support surface across the passageway, the flap being pivotal between an obstructing position generally perpendicular to the support surface and a non-obstructing position generally parallel and adjacent to the support surface;

spring means for automatically pivoting the flap into the obstructing position; and stop means for maintaining the flap in the obstructing position for preventing movement of the object from the support surface across the access opening but enabling pivotal movement of the flap to the nonobstructing position for enabling movement of the object through the access opening onto the support surface.

21. The safety flap apparatus of claim 20 further comprising:

latching means movable between a latched and an unlatched position, the latch means being in a normally latched position for holding the flap in the nonobstructing position; and means for moving the latching means from the normally latched position to the unlatched position, the flap rotating from the obstructing position to the nonobstructing position for being latched by the latching means when an object moves through the passageway to the support surface.

* * * * *